United States Patent [19]

Payne

[11] 4,040,158
[45] Aug. 9, 1977

[54] STEEL MILL ROLLS

[75] Inventor: Frederick George Payne, Dundas, Canada

[73] Assignee: Canron Limited, Montreal, Canada

[21] Appl. No.: 686,717

[22] Filed: May 17, 1976

[51] Int. Cl.² .............................................. B21B 31/08
[52] U.S. Cl. ....................................... 29/123; 29/125; 29/129.5
[58] Field of Search ...................... 29/125, 129.5, 123

[56] References Cited

U.S. PATENT DOCUMENTS

| | | | |
|---|---|---|---|
| 476,552 | 6/1892 | Pollard | 29/129.5 |
| 2,029,220 | 1/1936 | Brawn | 29/125 X |
| 2,080,027 | 5/1937 | Allsop et al. | 29/125 X |
| 2,532,325 | 12/1950 | Naumann | 29/123 X |

FOREIGN PATENT DOCUMENTS 42-8215  4/1967  Japan .................................. 29/129.5

Primary Examiner—Alfred R. Guest
Attorney, Agent, or Firm—Hirons & Rogers

[57] ABSTRACT

A laminated steel mill roll consists of a core member, a reversible replaceable shell member and a retaining member. The core member has a radially-outwardly extending shoulder, while the shell member has two symmetrically-disposed radially-inwardly extending shoulders, the core member shoulder engaging one shell member shoulder for location and retention of the shell member on the core member, and the retaining member fastened to the core member engaging the other shell member shoulder. The shell member can be made as two similar reversible replaceable portions, or as a plurality of such portions at least the two endmost being similar to one another, giving even greater possibility for interchange and increase in useful life.

5 Claims, 3 Drawing Figures

STEEL MILL ROLLS

FIELD OF THE INVENTION

This invention is concerned with improvements in or relating to rolls and especially, but not exclusively, to steel mill rolls.

REVIEW OF THE PRIOR ART

Steel mill rolls are employed extensively in steel fabricating operations, such rolls consisting of an integral cast and machined body, this body providing a hub for the reception of a shaft on which the roll is rotatably mounted, and an external cylindrical operative surface. Upon wear of the operative surface the entire roll must be replaced, or subjected to extensive reworking, such as the application thereto of hardface weld deposit.

DEFINITION OF THE INVENTION

It is an object of this invention to provide a new roll construction wherein a shell portion thereof providing the operative surface can be replaced without requiring replacement of the entire roll.

In accordance with the present invention there is provided a roll construction comprising a core member adapted for mounting upon a shaft; an outer shell member; and a retaining member; the core member having an outer surface of uniform radius extending from and including one end and being provided at the other end with a radially-outwardly-extending shoulder; the outer shell member being an axial sliding fit on the said core member outer surface and having respective radially-inwardly-extending shoulders adjacent its ends and equally spaced therefrom, each shell member shoulders being engageable with the said core shoulder upon mounting of the shell member on the core member for positioning and retaining the former axially on the latter, the length of the shell member between the said inwardly-extending shoulders being equal to the length of the said core member outer surface whereby the said core member one end and the adjacent shell member shoulder register axially with one another; and the retaining member comprising a flat ring mounted to the core member said one end and engageable with the axially registering shell member shoulder not engaged by the core member shoulder for retention of the shell member on the core member.

Preferably in such a roll construction the said core member has two outer surfaces of uniform radius each extending from and including one end, the core member being provided at its centre with two spaced centrally-disposed radially-outwardly-extending shoulders; the said outer shell member comprises two similar abutting shell member portions, each of which is disposed on a respective core member outer surface with their adjacent ends abutting, each portion having respective radially-inwardly-extending shoulders adjacent its ends and equally spaced therefrom, each shell member portion shoulder being engageable with a respective core shoulder upon mounting of the shell member portion on the core member; the length of each shell member portion between the said inwardly extending shoulders being equal to the length of the core member between each end and the corresponding centrally-disposed shoulder, whereby the said core member end and the adjacent shell member shoulder re-register axially with one another; and there are provided two flat ring retaining members each mounted to a respective core member end and engaging the respective axially registering shell member shoulder.

DESCRIPTION OF THE DRAWINGS

Roll constructions which are particular preferred embodiments of the invention will now be described, by way of example, with reference to the accompanying diagrammatic drawings wherein.

DESCRIPTION OF THE PREFERRED EMBODIMENTS

Figure 1:
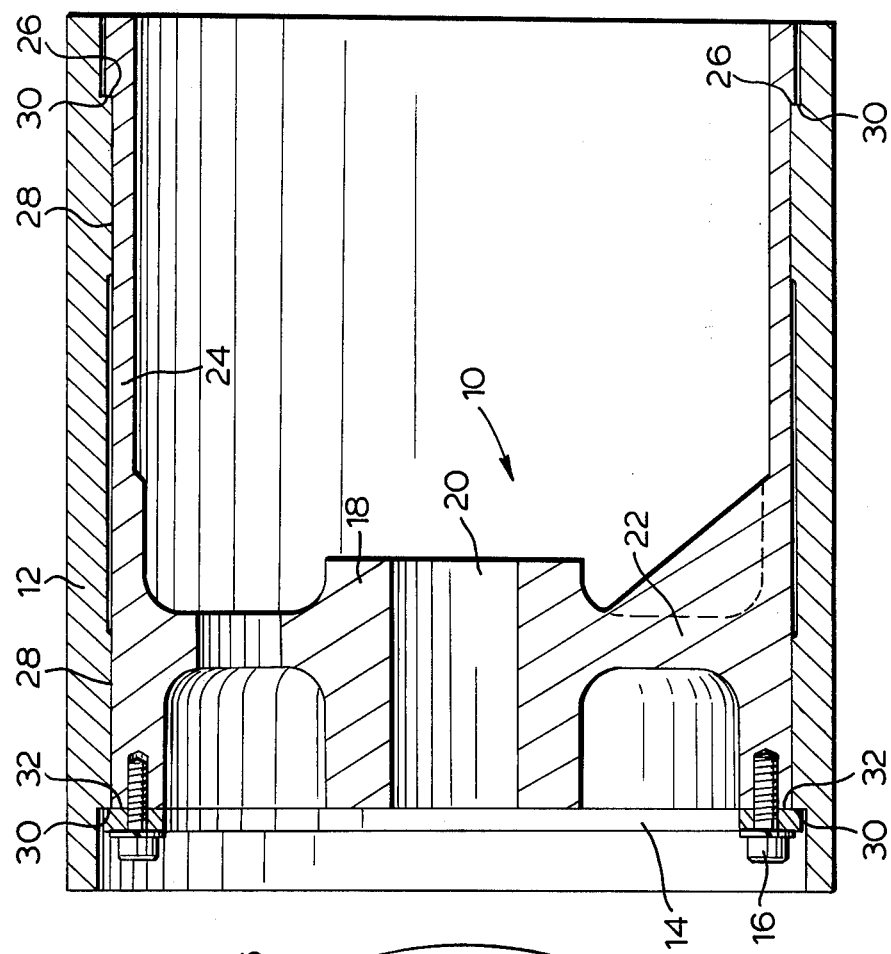
FIG. 1 is a longitudinal cross-section through a first embodiment.
Figure 2:
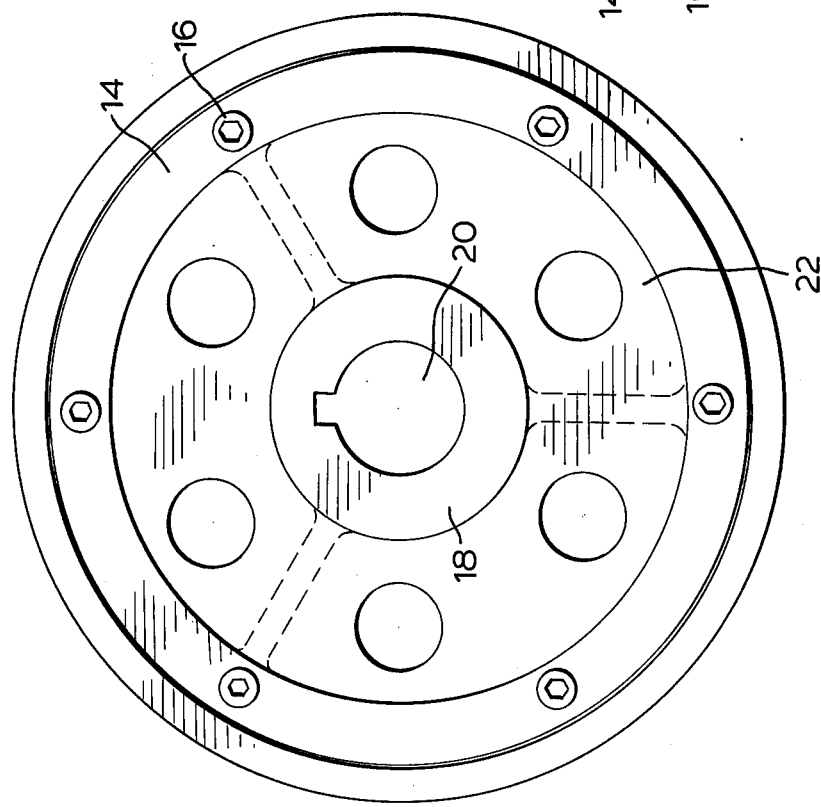
FIG. 2 is an end view of the embodiment of FIG. 1.

The first embodiment illustrated by FIGS. 1 and 2 comprises a laminated steel mill roll constituted by a core member 10, a cylindrical outer shell member 12 and a retaining ring member 14 fastened by axial bolts 16 to the core member. More specifically, the core member provides an axial hub 18 having a bore 20 for the reception of a shaft on which the roller is mounted a radially-outwardly extending web 22 and an axially-entending cylindrical shell-supporting portion 24. The outer surface of the portion 24 has adjacent to one end thereof a radially-outwardly extending shoulder 26. The outer shell member is a close sliding fit on the exterior surface of the core member portion 24, the core-engaging shell member inner surface being constituted by two accurately-machined narrow bands 28, so as to avoid the need for machining of the entire inner surface. The two symmetrically-disposed axially endmost, radially-inwardly-extending surfaces 30 of the bands 28 constitute locating shoulders, each of which will engage the core shoulder 26 when the shell member is slid on to the core member. The axial distance between the two shoulders 30 is equal to or greater than the axial distance between the shoulder 26 and the further end surface 32 of the core member, to which end surface the retaining ring 14 is clamped by the bolts 16. The ring 14 thus engages the shell shoulder 30 not engaged with the core shoulder 26 to retain the shell member on the core member.

If the shell member 12 becomes worn it is readily replaced upon removing the ring 14 and sliding it from the core. If the shell member is worn at one end only it need not be replaced immediately, but can be reversed upon the core member doubling its useful life.

Figure 3:
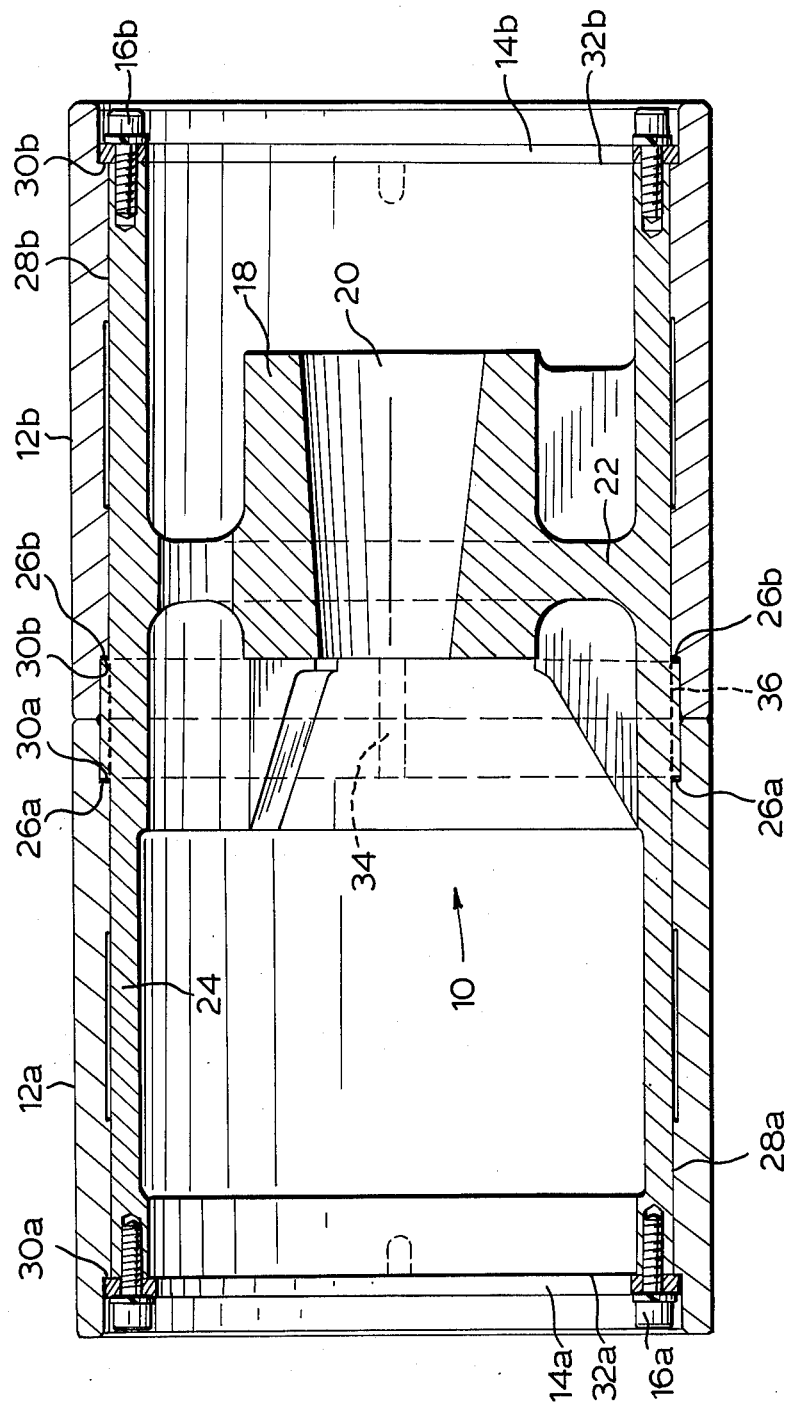
FIG. 3 is a cross-section similar to FIG. 1 of a second embodiment.

In the embodiment illustrated by FIG. 3 the shell member is constituted by two similar shell member portions 12a and 12b, which are slid onto the common core member 10 from either end thereof. The core member has two radially-outwardly extending shoulders 26a and 26b which are engaged respectively by shell member shoulders 30a and 30b. The roll is provided with two retaining members 14a and 14b, each attached to a respective end of the core member. In such an arrangement each shell member portion can be reversed end-for-end, and the two portions can also be interchanged, giving many greater possibilities for extending the life of the roll. Preferably, the two portions are connected together by an axially-extending key 34.

In another embodiment illustrated by FIG. 3, the portion of the core member providing the shoulders 30a and 30b is constituted by a ring 36 which is a close sliding fit on the core member; the ring is indicated by the broken line as separate from the core member and not integral therewith. In such an arrangement two retaining rings 14 are not required and a single ring can be used in conjunction with a shoulder 26 at the other end of the core member.

In other embodiments the shell member consists of a plurality of abutting portions, the two endmost of which only need be as illustrated herein for a two-part shell member. Two retaining rings 14 can be employed, or a single ring 14 with or without intermediate rings between each abutting pair of shell portions.

Since the two parts of the roll, namely the core and the shell, perform different functions, greater flexibility is provided in the choice of material for each. For example, it is possible to use wear-resisting materials and provide wear-resisting surfaces for the shell member that would not be possible and/or economical with an integral roll construction, increasing the useful life of the roll by a factor much greater than 3, e.g. up to about 6.

Because of this better wear resistance the downtime incurred with use of the rolls also is much reduced.

I claim:

1. A roll construction comprising:

a core member adapted for mounting upon a shaft;
an outer shell member; and
a retaining member;
the core member having an outer surface of uniform radius extending from and including one end and being provided at the other end with a radially-outwardly-extending shoulder;
the outer shell member being an axial sliding fit on the said core member outer surface and having respective radially-inwardly-extending shoulders adjacent its ends and equally spaced therefrom, each shell member shoulder being engageable with the said core shoulder upon mounting of the shell member on the core member for positioning and retaining the former axially on the latter, the length of the shell member between the said inwardly-extending shoulders being equal to the length of the said core member outer surface whereby the said core member one end and the adjacent shell member shoulder register axially with one another; and
the retaining member comprising a flat ring mounted to the core member said one end and engageable with the axially registering shell member shoulder not engaged by the core member shoulder for retention of the shell member on the core member.

2. A roll construction as claimed in claim 1, wherein the shell member cylindrical inner surface that engages the core member cylindrical outer surface is constituted by two or more spaced narrow bands.

3. A roll construction as claimed in claim 1, wherein the said core member has two outer surfaces of uniform radius each extending from and including one end, the core member being provided at its centre with two spaced centrally-disposed radially-outwardly-extending shoulders;

the said outer shell member comprises two similar abutting shell member portions, each of which is disposed on a respective core member outer surface with their adjacent ends abutting, each portion having respective radially-inwardly-extending shoulders adjacent its ends and equally spaced therefrom, each shell member portion shoulder being engageable with a respective core shoulder upon mounting of the shall member portion on the core member;

the length of each shell member portion between the said inwardly-extending shoulders being equal to the length of the core member between each end and the corresponding centrally-disposed shoulder, whereby the said core member end and the adjacent shell member shoulder register axially with one another;

and there are provided two flat ring retaining members each mounted to a respective core member end and engaging the respective axially registering shell member shoulder.

4. A roll construction as claimed in claim 3, wherein the said centrally-disposed core member shoulders are provided by a centrally disposed ring which is an axial sliding fit on the core member outer surface.

5. A roll construction as claimed in claim 3, wherein each shell member portion cylindrical inner surface engaging with a sliding fit the core member cylindrical outer surface is constituted by two or more spaced narrow bands.

* * * * *